(12) United States Patent
Kawamura et al.

(10) Patent No.: US 6,452,880 B1
(45) Date of Patent: Sep. 17, 2002

(54) OPTICAL PICKUP APPARATUS

(75) Inventors: Makoto Kawamura; Shinichi Takahashi; Hirokatsu Nagatake; Aki Yoshioka; Mitsutoshi Sugano; Ko Ishii; Akira Miura; Masayuki Koyama, all of Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/704,822

(22) Filed: Nov. 3, 2000

(30) Foreign Application Priority Data

Dec. 22, 1999 (JP) .......................................... 11-365584

(51) Int. Cl.⁷ ................................................ G11B 7/00
(52) U.S. Cl. ............................... 369/44.37; 369/112.01; 369/44.28
(58) Field of Search ........................ 369/44.41, 44.11, 369/44.12, 44.23, 44.27, 44.28, 44.37, 47.1, 53.1, 53.2, 53.41, 112.01, 116

(56) References Cited

U.S. PATENT DOCUMENTS 5,430,701 A * 7/1995 Ito et al. .................. 369/44.41
6,240,053 B1 * 5/2001 Akiyama ................. 369/44.23

* cited by examiner

Primary Examiner—Muhammad Edun
(74) Attorney, Agent, or Firm—McGinn & Gibb, PLLC

(57) ABSTRACT

An optical pickup apparatus capable of reading information from recording media of different read wavelengths, includes a light-emitter having a first light source for emitting a first laser beam integrated with a second light source for emitting a second laser beam of a different wavelength from that of the first laser beam. The optical pickup apparatus includes a photodetector for receiving a beam reflected by each of the recording media and an optical system having a plurality of optical elements which form an optical path to guide the first and second laser beams to the recording media and which form an optical path for guiding the reflected beam to the photodetector and through which the first and second laser beams pass.

11 Claims, 17 Drawing Sheets

IMAGE HEIGHT (DISTANCE FROM THE DISTAL END)

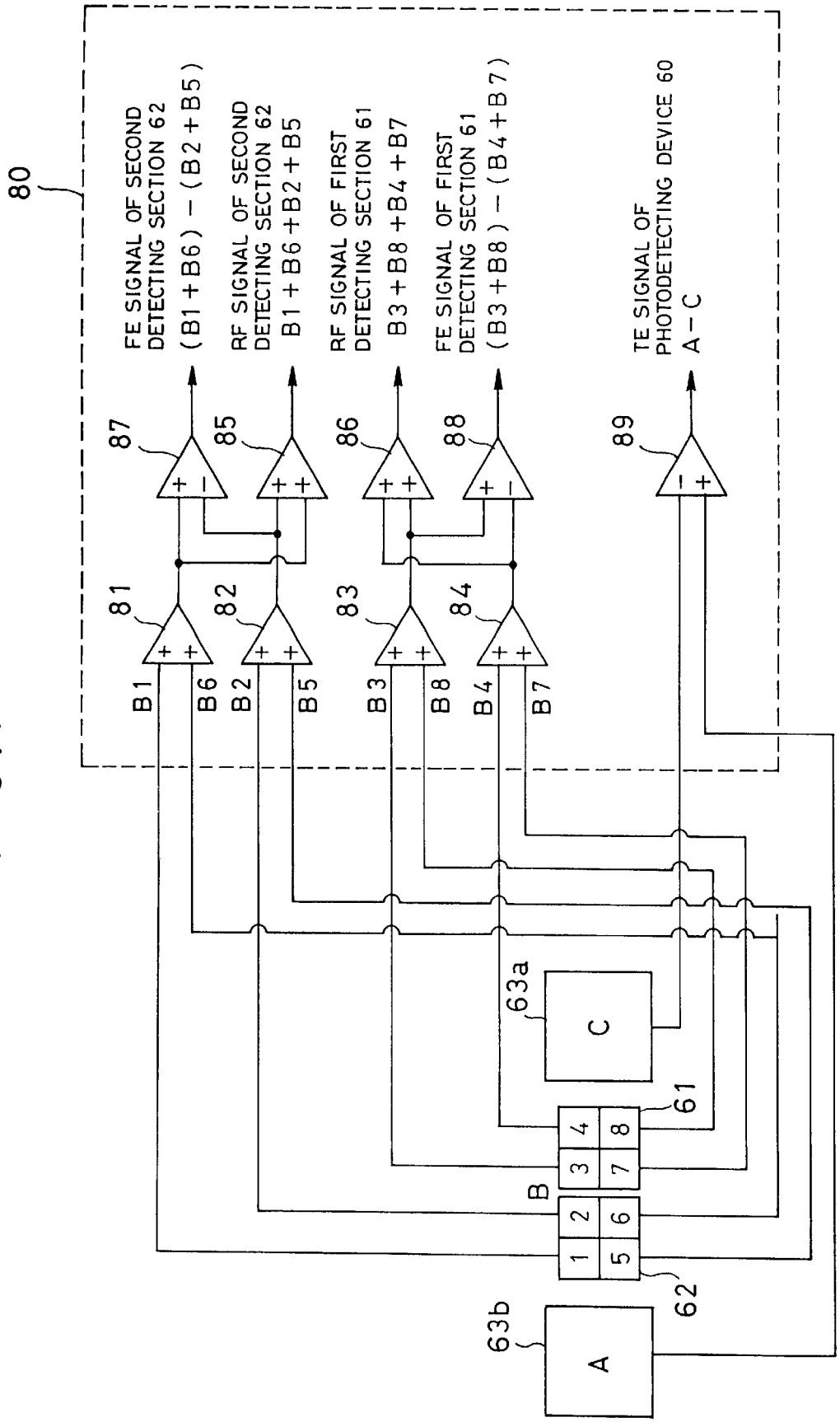

OPTICAL PICKUP APPARATUS

BACKGROUND OF THE INVENTION

1. Field of the Invention

The present invention relates to an optical pickup apparatus capable of reading two or more kinds of recording media of different read wavelengths, such as an optical pickup apparatus compatible for DVD (Digital Versatile Disc) and CD (Compact Disc), and, more particularly, to an optical pickup apparatus that uses a semiconductor laser device constituting a one-chip laser diode which emits two laser beams of different wavelengths.

2. Description of Related Art

There have been active proposals of DVD/CD compatible players which use both the optical pickups of a CD player and a DVD player. Those players are classified into a DVD/CD compatible player using a one-wavelength bifocal optical pickup and a DVD/CD compatible player using a two-wavelength bifocal optical pickup.

A description will now be given of the comparison of the structures of a CD and DVD with each other. The thickness of the protection layer of a DVD (which is 0.6 mm) is about a half of that of the protection layer of a CD. In the case where both optical disks are played using a unifocal optical pickup, when focused on the information recording surface of a CD in the way that is optimal for the information recording surface of a DVD, the light beam will have an aberration, such as spherical aberration, because the protection layer of the CD that the light beam passes is thicker than that of the DVD. This disables the optimal light focusing on the information recording surface of the CD. As the size of information pits formed to record information differs between the CD and DVD, a beam spot of the optimal size for information pits on the CD and a beam spot of the optimal size for information pits on the DVD should be formed respectively on the information recording surfaces of the CD and DVD in order to accurately read the respective information pits.

The size of a beam spot is proportional to the ratio of the wavelength of a laser beam to the numerical aperture of an objective lens which condenses the laser beam onto the information recording surface. That is, given that the wavelength of the laser beam is constant, the greater the numerical aperture is, the smaller the beam spot becomes. In the case where both a CD and DVD are played using a unifocal optical pickup, therefore, if the wavelength of the laser beam is designed constant and the numerical aperture of the objective lens is designed adequate for the information pits of, for example, the DVD, the beam spot would become too small for the information pits of the CD. This produces distortion in signals reproduced from the CD, thus making it hard to read those signals accurately. To cope with this situation, the current trend is toward a DVD/CD compatible player that uses a bifocal optical pickup which can have focus at different positions on the same line and can form a beam spot of the adequate size for the size of each type of information pits.

The optical pickup apparatus of the DVD/CD compatible player that requires two light sources needs a synthesizing prism which makes the cost of this apparatus higher than the optical pickup apparatus that uses a single light source. In addition, if the first light source emits a light beam to one surface of the first beam splitter, the second light source should emit a light beam to the surface of the first beam splitter that is at the right angles to the first light source, requiring larger installing space for the optical systems. This inevitably enlarges the optical pickup apparatus.

OBJECTS AND SUMMARY OF THE INVENTION

Accordingly, it is an object of the present invention to provide an optical pickup apparatus which is compatible for two wavelengths without using a synthesizing prism and can thus be made compact.

To achieve the above object, according to one aspect of this invention, there is provided an optical pickup apparatus capable of reading information from recording media of different read wavelengths, which comprises light-emitting means having a first light source for emitting a first laser beam integrated with a second light source, located close to the first light source, for emitting a second laser beam of a different wavelength from that of the first laser beam; photodetection means for receiving a beam reflected by each of the recording media, the photodetection means including a nine-divided detector having nine light-receiving areas arranged in three columns by three rows; and an optical system having a plurality of optical elements which form an optical path to guide the first and second laser beams to the recording media and form an optical path for guiding the reflected beam to the photodetection means and through which the first and second laser beams pass.

In this optical pickup apparatus, it is preferable that each of the first and second laser beams should be received at four of the nine light-receiving areas of the nine-divided detector, which include a center one of the nine light-receiving areas and are arranged in two columns by two rows, and the four light-receiving areas of the nine-divided detector which receive the first laser beam should be different from the four light-receiving areas of the nine-divided detector which receive the second laser beam.

In the above preferable mode of the optical pickup apparatus, it is further preferable that at least a read signal and a focus error signal should be generated by performing an arithmetic operation on amounts of light respectively received at the four light-receiving areas.

In the first preferable mode or the second preferable mode of the optical pickup apparatus, it is further preferable that a pair of light-receiving sections to be used in generating a tracking error signal should be respectively formed on both sides of the nine-divided detector in such a range as to be able to receive both a pair of first sub beams generated on both sides of the first laser beam with the first laser beam in between and a pair of second sub beams generated on both sides of the second laser beam with the second laser beam in between.

BRIEF DESCRIPTION OF THE DRAWINGS

FIG. 11 is a block diagram of an arithmetic operation section which processes detection signals from the photodetecting sections;

DETAILED DESCRIPTION OF THE PREFERRED EMBODIMENT

Before entering into the discussion of optical pickup apparatuses according to preferred embodiments of the present invention, a description will be given of one example of the conventional optical pickup apparatus referring to FIG. 1.

Figure 1:
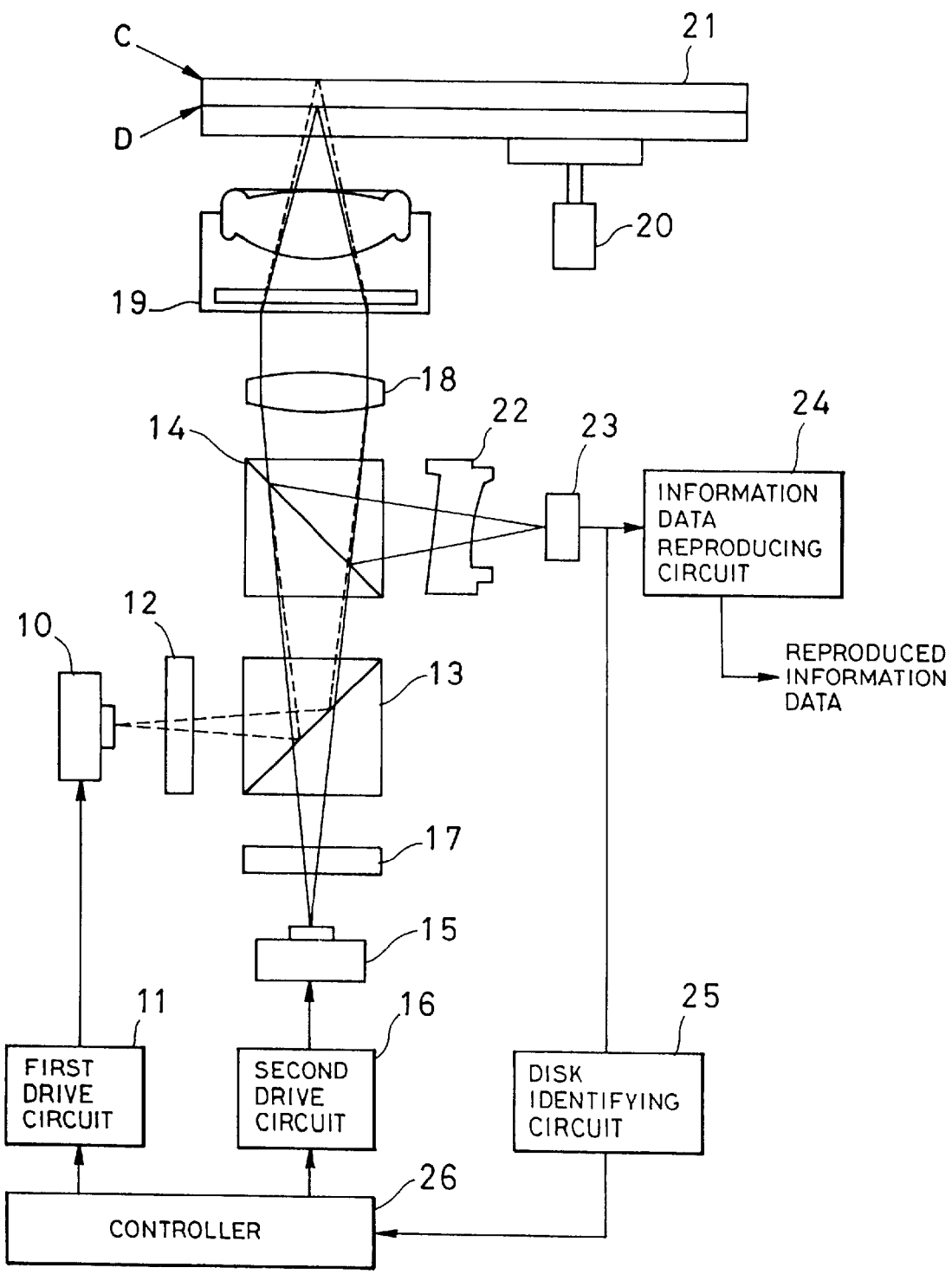
FIG. 1 is a diagram showing the structure of a conventional optical pickup apparatus.

For example, the optical pickup apparatus shown in FIG. 1 is a DVD/CD compatible player that combines the light beams from a first light source 10 for a CD and a second light source 15 for a DVD using a first beam splitter 13 which is a synthesizing prism and uses a bifocal lens comprised of an objective lens and a diffraction element which is an aperture limiting element. The structure and the operation of this optical pickup apparatus will now be discussed briefly.

Referring to this diagram, the first light source 10 generates a laser beam (indicated by the broken line) of the optimal wavelength (780 nm) for reading information from a CD in accordance with a drive signal from a first drive circuit 11 and irradiates this laser beam to the first beam splitter 13 via a grating 12 for generating three beams. The first beam splitter 13 reflects the laser beam from the first light source 10 and guides the reflected light to a second beam splitter 14.

The second light source 15 disposed at 90 degrees to the first light source 10 generates a laser beam (indicated by the solid line) of the optimal wavelength (650 nm) for reading information from a DVD in accordance with a drive signal from a second drive circuit 16 and irradiates this laser beam to the first beam splitter 13 via a grating 17. The first beam splitter 13 reflects the laser beam from the second light source 15 and guides the reflected light to the second beam splitter 14.

The second beam splitter 14 guides the laser beam, which has been supplied via the first beam splitter 13, or the laser beam from the first light source 10 or the second light source 15 to a bifocal lens 19 via a collimator lens 18. The bifocal lens 19 irradiates the condensed beam spot of the laser beam from the second beam splitter 14, as information reading light, onto the information recording surface of an optical disk 21 which is turned by a spindle motor 20.

The laser beam from the first light source 10 (which is indicated by the broken line) is condensed by the bifocal lens 19 in such a way as to be focused on an information recording surface C of the optical disk 21. The laser beam from the second light source 15 (which is indicated by the solid line) is condensed by the bifocal lens 19 in such a way as to be focused on an information recording surface D of the optical disk 21.

The reflected light that has been produced by irradiation of the information reading light from the bifocal lens 19 onto the optical disk 21 passes through the bifocal lens 19 and the collimator lens 18, is reflected at the second beam splitter 14, passes through a cylindrical lens 22 which is an astigmatism generating element, and is irradiated onto a photodetecting device 23. The photodetecting device 23 generates an analog electric signal whose level corresponds to the amount of the irradiated light and sends this signal as a read signal to an information data reproducing circuit 24 and a disk identifying circuit 25. The information data reproducing circuit 24 generates a digital signal based on the acquired read signal, and performs demodulation and error correction on the digital signal to reproduce information data. The disk identifying circuit 25 identifies the type of the optical disk 21 based on the size of the beam spot that is formed at the time of irradiating the laser beam on the optical disk 21 and sends a disk identification (ID) signal specifying the disk type to a controller 26 as disclosed in Japanese Unexamined Patent Publication No. Hei 10-255274. In accordance with the disk ID signal, the controller 26 selectively enables one of the first drive circuit 11 and the second drive circuit 16.

When the disk ID signal from the disk identifying circuit 25 specifies a CD, the controller 26 drives the first drive circuit 11 alone. Therefore, the laser beam emitted from the first light source 10 is irradiated on the optical disk 21 via an optical system which is comprised of the grating 12, the first beam splitter 13, the second beam splitter 14, the collimator lens 18 and the bifocal lens 19. When the disk ID signal from the disk identifying circuit 25 specifies a DVD, the controller 26 drives the second drive circuit 16 alone.

Accordingly, the laser beam emitted from the second light source 15 is irradiated on the optical disk 21 via an optical system which is comprised of the grating 17, the first beam splitter 13, the second beam splitter 14, the collimator lens 18 and the bifocal lens 19. In other words, this optical pickup apparatus is equipped with the first light source 10 which generates a laser beam of the optimal wavelength for reading information from the optical disk 21 having a relatively low recording density, such as a CD, and a second light source 15 which generates a laser beam of the optimal wavelength for reading information from the optical disk 21 having a high recording density, such as a DVD, and selects one of the light sources that is adapted to the type of the optical disk 21 to be played.

The reflected light (returning light) reflected at the information recording surface of the optical disk 21 passes through the bifocal lens 19 and the collimator lens 18, is reflected by the second beam splitter 14 and passes through the cylindrical lens 22 to be irradiated on the photodetecting device 23. Because the wavelength of the returning light of the first light source 10 differs from the wavelength of the returning light of the second light source 15 at this time, the refractive index of the former light at the time the light passes the optical components differs from the refractive index of the latter light. This causes a so-called chromatic aberration which results in different focal distances. This chromatic aberration causes an error in the focus error signal. In the case where focus servo control is carried out by the astigmatism method, generally, the photodetector is placed at the position where the beam that has passed the astigmatism generating element has an approximately circular cross section when the disk is located at the focal plane of the objective lens. If the focal distance of the returning light of the first light source 10 differs from the focal distance of the returning light of the second light source 15, the position where the beam's cross section becomes approximately circular differs, thus causing an error in either one of the focus error signals.

As apparent from the foregoing description, the optical pickup apparatus of the DVD/CD compatible player that requires two light sources needs a synthesizing prism which makes the cost of this apparatus higher than the optical pickup apparatus that uses a single light source. In addition, if the first light source 10 emits a light beam to one surface of the first beam splitter 13, the second light source 15 should emit a light beam to the surface of the first beam splitter 13 that is at the right angles to the first light source 10, requiring larger installing space for the optical systems. This inevitably enlarges the optical pickup apparatus.

The following will describe preferred embodiments of this invention as adapted to an optical pickup apparatus which plays a DVD and CD or CD-R (Compact Disk Recordable) of different read wavelengths. Note that recording media to be played back are not limited to those type, but this invention can be adapted to any optical pickup apparatus which plays a plurality of disks of different read wavelengths.

Figure 2:
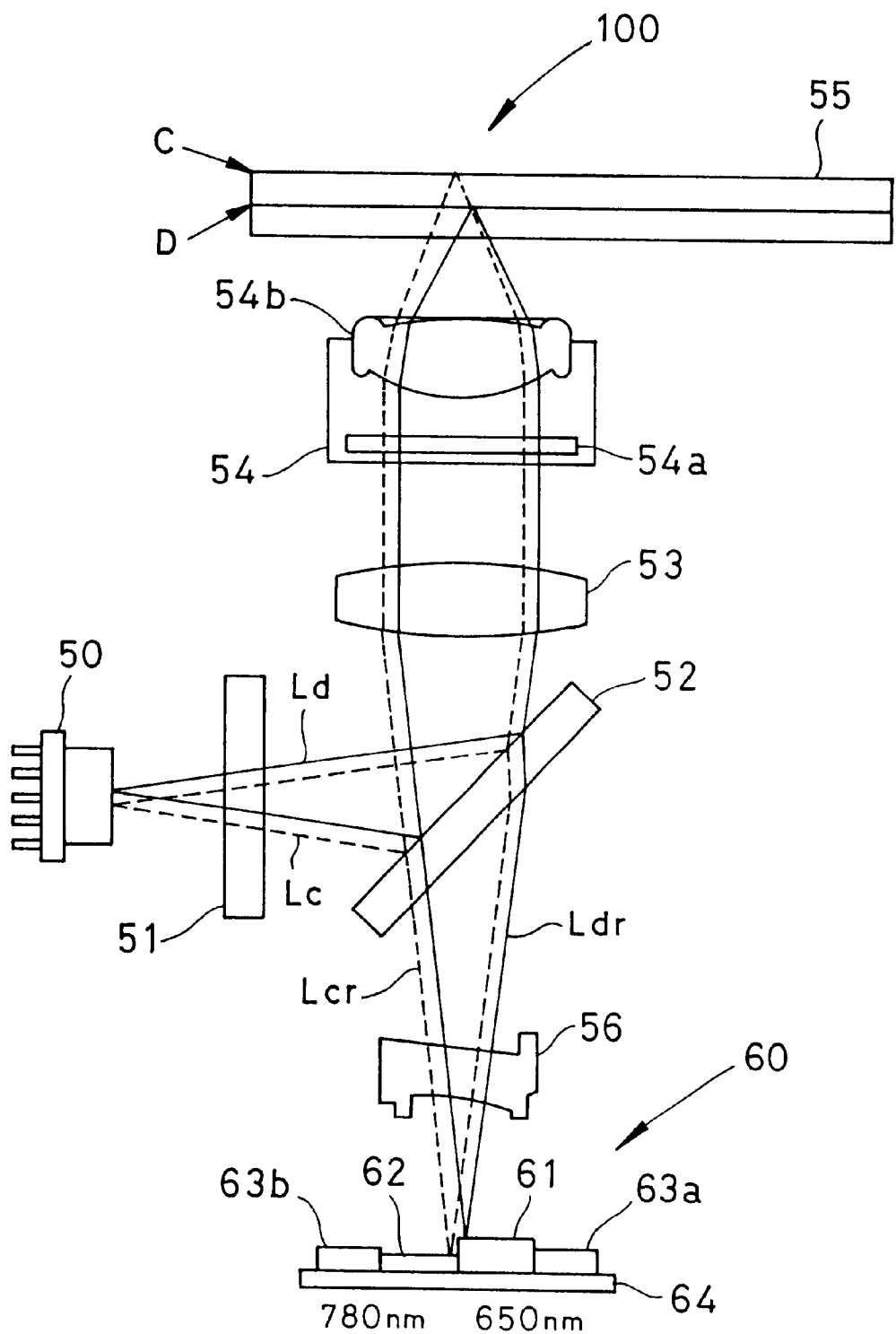
FIG. 2 is a diagram showing the structure of a first embodiment of an optical pickup apparatus according to the present invention.

FIG. 2 is a structural diagram showing the essential portions of an optical pickup apparatus 100 as the first embodiment of the present invention. The structure of the optical pickup apparatus 100 will be discussed below referring to this diagram. The optical pickup apparatus 100 comprises a semiconductor laser device 50 as light-emitting means which emits two laser beams of different wavelengths, a grating 51 which generates a pair of sub beams for generation of a tracking error signal from the emitted laser beam, a half mirror 52 which reflects the laser beam emitted from the semiconductor laser device 50 and guides it to an optical disk 55 and passes the laser beam reflected at the recording surface of the optical disk 55 and guides it in a direction toward a photodetecting device 60, a collimator lens 53 which converts the laser beam to parallel light, a bifocal lens 54 which condenses laser beams of different wavelengths and makes focal points at different positions on the same straight line to form beam spots of the adequate sizes, a cylindrical lens 56 as an astigmatism generating element, and the photodetecting device 60 as photodetection means.

As apparent from the above, this embodiment carries out focus servo control by the astigmatism method and tracking servo control by the 3-beam method. As the electric circuits, such as the drive circuit for the semiconductor laser device 50 and the disk identifying circuit, are the same as those of the prior art, they are not illustrated.

Figure 3:
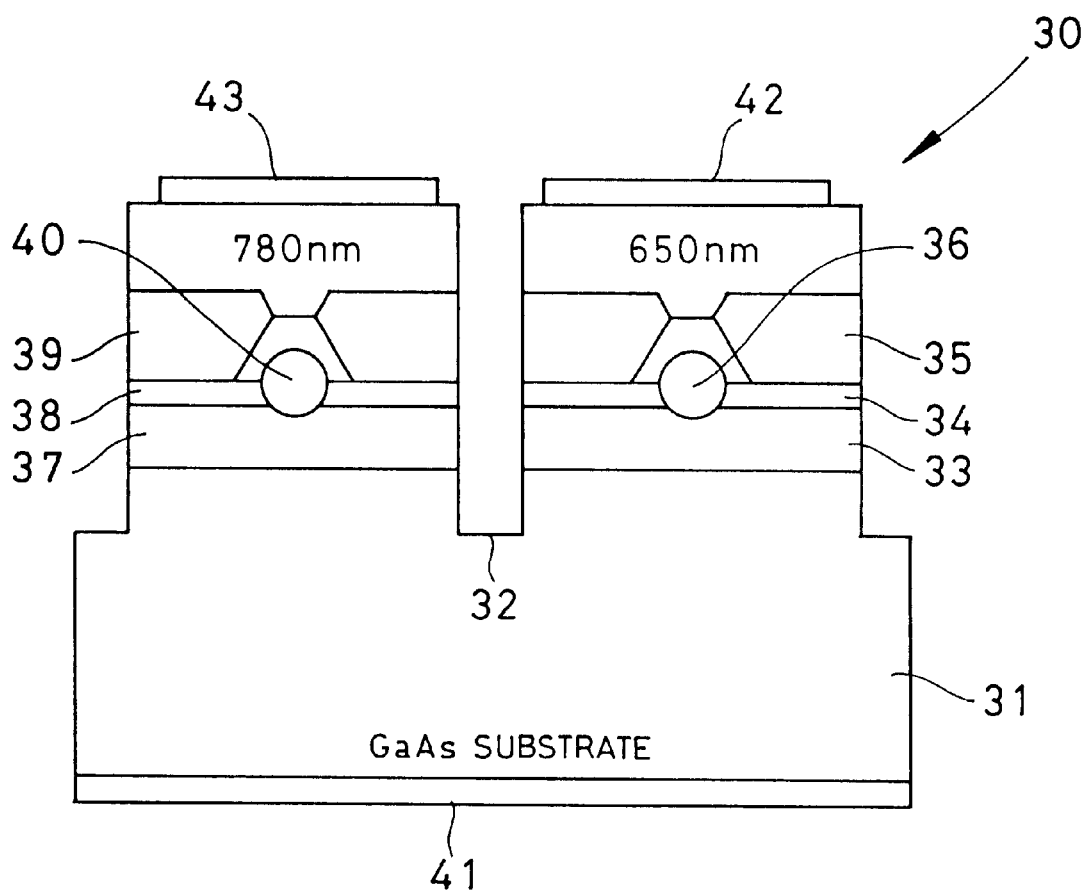
FIG. 3 is a diagram showing the structure of a semiconductor laser device used in the first embodiment of the optical pickup apparatus according to this invention.
Figure 4:
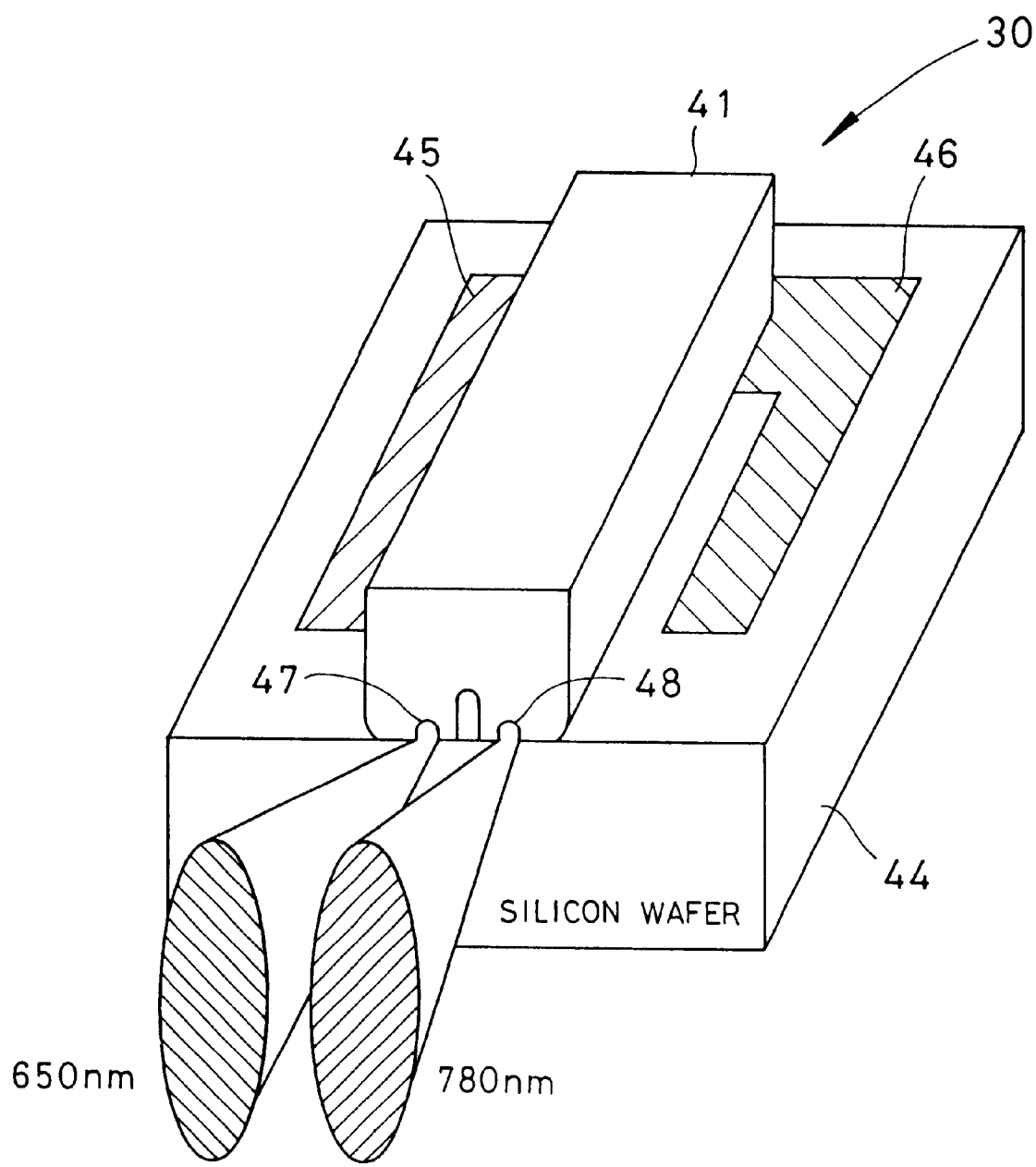
FIG. 4 is a diagram showing the structure of the semiconductor laser device used in the first embodiment of the optical pickup apparatus according to this invention.

The semiconductor laser device 50 is a one-chip laser diode 30 which emits a laser beam of a wavelength of 780 nm for reading information from a CD and CD-R and emits a laser beam of a wavelength of 650 nm for reading information from a DVD. The structure of the one-chip laser diode 30 is illustrated in FIGS. 3 and 4. FIG. 3 shows the cross section of the one-chip laser diode 30, and FIG. 4 shows the sub-mounting of the one-chip laser diode 30.

As shown in FIG. 3, the one-chip laser diode 30 has an n-type $Al_xGa_yIn_{1-x-y}P$ layer 33, an $Al_xGa_yIn_{1-x-y}P$ active layer 34 and a p-type $Al_xGa_yIn_{1-x-y}P$ layer 35 deposited on a GaAs substrate 31 having an outer dimension of about 300 $\mu m \times 400 \mu m \times 100$ to $120 \mu m$, with a light-emitting section 36 of 650 nm formed in the center of the active layer 34. This light-emitting section 36 becomes a first light source to emit a first laser beam of a wavelength of 650 nm. The one-chip laser diode 30 further has an n-type $Al_xGa_{1-x}As$ layer 37, an $Al_xGa_{1-x}As$ active layer 38 and a p-type $Al_xGa_{1-x}As$ layer 39 deposited on the GaAs substrate 31, with a light-emitting section 40 of 780 nm formed in the center of the active layer 38. This light-emitting section 40 becomes a second light source to emit a second laser beam of a wavelength of 780 nm. The two active layers 34 and 38 both having thicknesses of about 4 $\mu m$ are isolated from each other by an isolation groove 32. The one-chip laser diode 30 further has a common electrode 41 formed on the bottom side of the GaAs substrate 31, an Au electrode 42 for the 650-nm laser beam formed on the top side of the first light source and an Au electrode 43 for the 780-nm laser beam formed on the top side of the second light source. That is, the one-chip laser diode 30 is the semiconductor laser device 50 which has one of the electrodes of the first and second light sources formed as a common electrode.

In general, a "one-chip" device means a device which has two different types of active layers formed on one chip by a selective growth method or the like to be able to emit laser beams of two wavelengths. In this invention, however, a "one-chip" device includes a device in which two laser devices each of which emits a 1-wavelength laser beam are disposed on, for example, a silicon wafer in a hybrid manner, i.e., an integrated unit of two 1-wavelength laser devices.

As shown in FIG. 4, the one-chip laser diode 30 is used in such a manner as to be sub-mounted on a silicon wafer 44 where two Al electrodes 45 and 46 are formed. Specifically, "sub-mounting" is to mount the one-chip laser diode 30, with the common electrode 41 at the top, on the silicon wafer 44 where the Al electrode 45 for the 650-nm light-emitting device and the Al electrode 46 for the 780-nm light-emitting device are formed and solder the 650-nm electrode 42 and the 780-nm electrode 43 respectively to the Al electrodes 45 and 46. Unillustrated leads are soldered to the common electrode 41 and the two Al electrodes 45 and 46. When a predetermined voltage is applied between the common electrode 41 and the Al electrode 45, the first laser beam of 650 nm is emitted from an emission window 47. When a predetermined voltage is applied between the common electrode 41 and the Al electrode 46, the second laser beam of 780 nm is emitted from an emission window 48. Both laser beams have elliptical shapes as illustrated in FIG. 4. The one-chip laser diode 30 in a sub-mounted form is housed in, for example, an unillustrated case which is provided with an emission window and a plurality of output terminals and is used in this state as the semiconductor laser device 50.

Next, the operation of the optical pickup apparatus 100 as the first embodiment of this invention will be discussed. In the semiconductor laser device 50 used in the optical pickup apparatus 100 as the first embodiment of this invention, the 650-nm light-emitting section 36 which emits the first laser beam of 650 nm and the 780-nm light-emitting section 40 which emits the second laser beam of 780 nm are formed on the same chip at different positions approximately 100 nm apart from each other as described above. As shown in FIG. 2, therefore, the optical path for the first laser beam slightly differs from the optical path for the second laser beam.

It is to be noted that the first laser beam and the second laser beam are selectively enabled, so that the two optical paths are not formed at the same time. For the sake of easier explanation, however, FIG. 2 shows all of incident light Ld (solid line) of the first laser beam, incident light Lc (broken line) of the second laser beam, returning light Ldr of the first laser beam reflected at the information recording surface and returning light Lcr of the second laser beam reflected at the information recording surface.

The following will discuss how to set the positions of the light-emitting section 36 and the light-emitting section 37. In an optical pickup apparatus including a light source and an objective lens, generally speaking, the light source is disposed on the center axis of the objective lens. Since the semiconductor laser device 50 emits the first laser beam and the second laser beam from the positions approximately 100 nm apart from each other, however, it is not possible to position both of the light sources of the two laser beams on the center axis of the objective lens. It is therefore necessary to optimize the positional relationship between the two light sources with respect to the center axis of the optical system.

Figure 5:
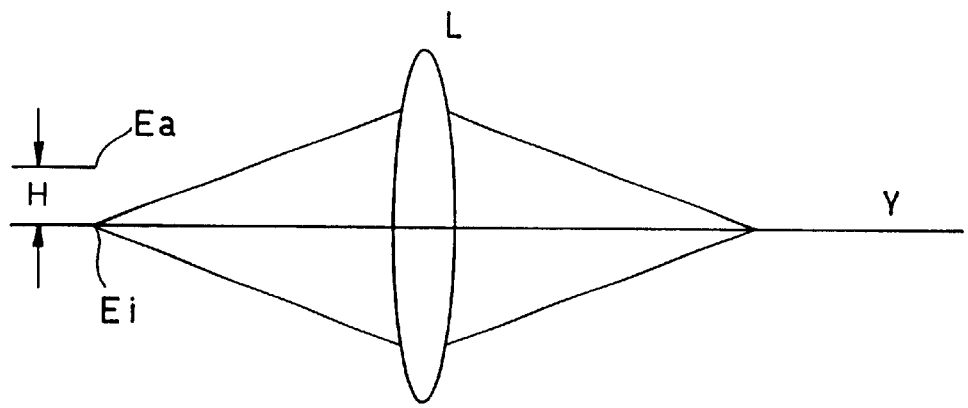
FIG. 5 is a diagram showing the positional relationship between a light source and the center axis of a lens.

It is known that arranging a light source Ei on the center axis Y of an objective lens L as shown in FIG. 5 minimizes the size of the beam spot. Therefore, the light source Ei positioned on the center axis Y of the objective lens L can be an ideal light-emitting point. When the center Ea of the light source Ei does not coincide with the optical axis Y, however, the "image height" becomes "H" and "aberration" exists. As the "aberration" adversely affects the read signal, it is desirable to make the "aberration" as small as possible.

Figure 6:
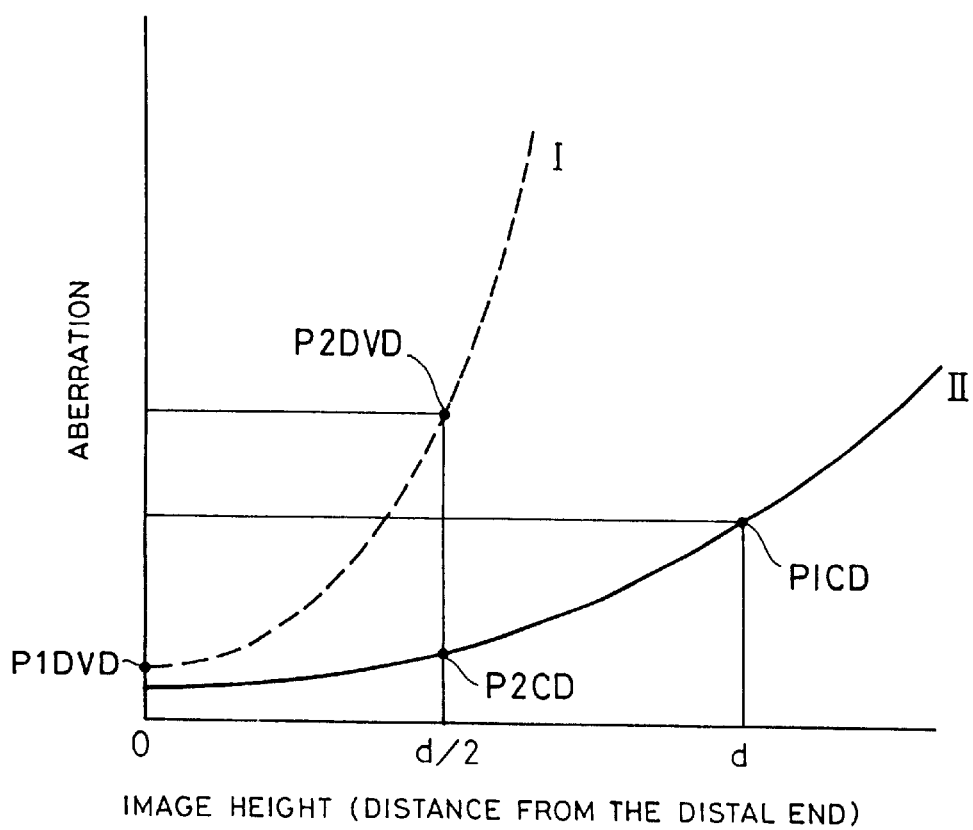
FIG. 6 is a diagram showing the relationship between the height of an image and an aberration.

FIG. 6 shows the relationship between the height of an image and an aberration, the broken line indicating the relationship between the image height and aberration when a DVD is played while the solid line indicating the relationship between the image height and aberration when a CD is played. As apparent from this diagram, the aberration when a DVD is played is greater than the aberration when a CD is played, irrespective of the image height, and the rate of an increase in the aberration at the time of playing a DVD (the inclination of the broken line) is greater than the rate of an increase in the aberration at the time of playing a CD (the inclination of the solid line). Even when the image height=0, i.e., even when the light-emitting point is set on the optical axis, the aberration at the time of playing a DVD is greater than the aberration at the time of playing a CD. This is because information is recorded on a DVD with a higher density than on a CD so that the size of the beam spot to be irradiated on the DVD is made smaller than the spot size for a CD. In other words, reading information from a disk with a high recording density, such as a DVD, using a short-wavelength laser beam is more likely to be affected by the deviation of the image height than reading information from a disk with a low recording density, such as a CD, using a long-wavelength laser beam.

According to the optical pickup apparatus 100 as the first embodiment of this invention, therefore, the 650-nm light-emitting section 36 in the semiconductor laser device 50, which emits the first laser beam, is placed on the center axis of the optical system or the distance from the 650-nm light-emitting section 36 to the center axis of the optical system is set shorter than the distance from the 780-nm light-emitting section 37 which emits the second laser beam to the center axis of the optical system. That is, the deviation of the image height for a DVD which is greatly affected by that deviation is made smaller than the deviation of the image height for a CD.

Referring now to FIG. 2, a description will be given of the operations of playing a DVD and CD as recording media. Note that like the prior art, the optical pickup apparatus 100 embodying this invention performs disk discrimination and selectively drives one of the light sources of the semiconductor laser device 50 based on the result of the disk discrimination.

In the case of playing the optical disk 55 which is a DVD, part of the incident light Ld (solid line in the FIG.) of the first laser beam emitted from the semiconductor laser device 50 is reflected by the half mirror 52 via the grating 51, is converted to parallel light by the collimator lens 53 and then enters the bifocal lens 54. The first laser beam incident to the bifocal lens 54 is diffracted to the 0-order light, ± primary lights and other higher order lights by a diffraction element 54*a*. As the 0-order light is used in playing a DVD, however, an objective lens 54*b* condenses the 0-order light of the first laser beam on the information recording surface D of the optical disk 55. Then, the returning light Ldr of the first laser beam reflected at the information recording surface D of the DVD passes through the bifocal lens 54 and the collimator lens 53 and is partially transmitted through the half mirror 52. The transmitted light then passes through the cylindrical lens 56 and enters a first detecting section 61 of the photo-detecting device 60.

In the case of playing the optical disk 55 which is a CD, part of the incident light Lc (solid line in the FIG.) of the second laser beam emitted from the semiconductor laser device 50 is reflected by the half mirror 52 via the grating 51, is converted to parallel light by the collimator lens 53 and then enters the bifocal lens 54. The first laser beam incident to the bifocal lens 54 is diffracted to the 0-order light, ± primary lights and other higher order lights by the diffraction element 54*a*. As one of the ± primary lights is used in playing a CD, however, the objective lens 54*b* condenses the ± primary lights of the incident light Lc of the second laser beam that have been diffracted by the diffraction element 54*a* onto the information recording surface C of the optical disk 55. Then, the returning light Lcr of the second laser beam reflected at the information recording surface C of the CD passes through the bifocal lens 54 and the collimator lens 53 and is partially transmitted through the half mirror 52. The transmitted light then passes through the cylindrical lens 56 and enters a second detecting section 62 of the photodetecting device 60.

The two returning lights Ldr and Lcr reflected at the respective information recording surfaces D and C pass through the same optical components of the collimator lens 53, the half mirror 52 and the cylindrical lens 56 with the bifocal lens 54 as the boundary and reaches the photodetecting device 60, so that their returning optical paths are identical. Because the wavelength of the first laser beam differs from the wavelength of the second laser beam, however, the diffractive indexes of those returning lights at the time of passing through the optical components differ from each other. This makes the focal positions of the returning lights Ldr and Lcr along their optical axes different from each other.

Figure 7:
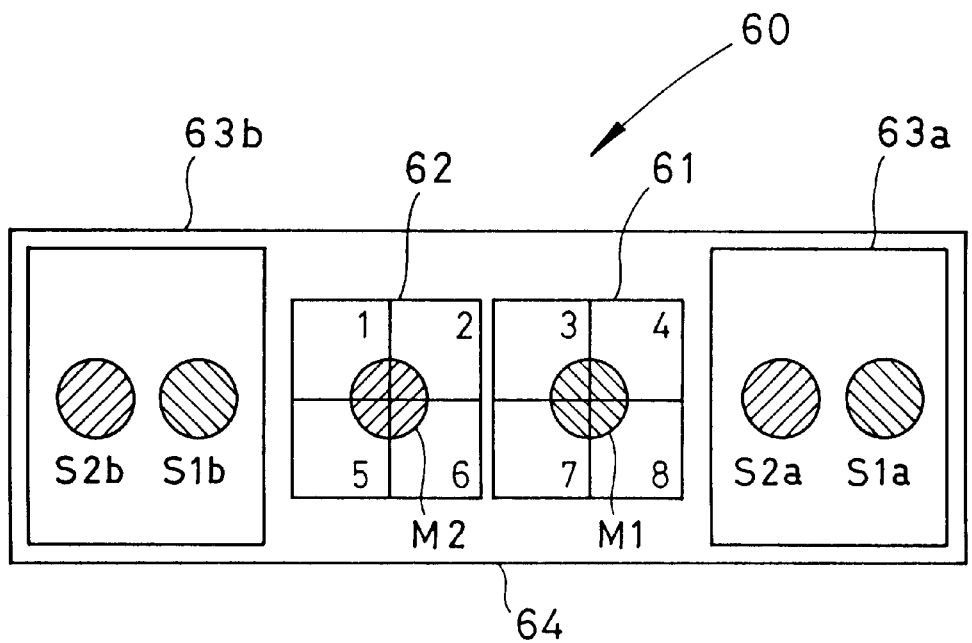
FIG. 7 is a plan view of photodetecting sections used in the first embodiment of the optical pickup apparatus according to this invention.
Figure 8:
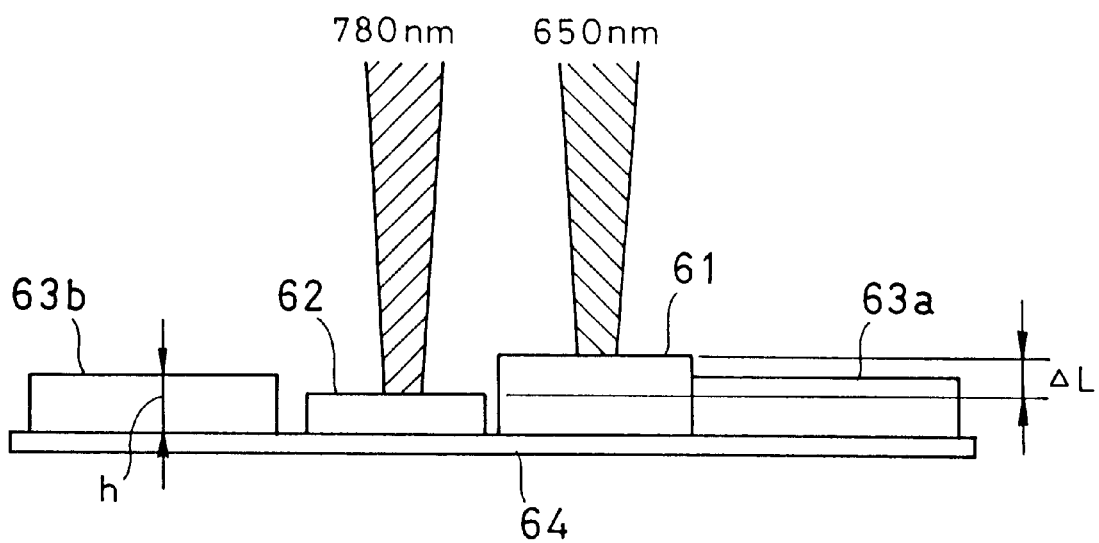
FIG. 8 is a side view of the photodetecting sections used in the first embodiment of the optical pickup apparatus according to this invention.

In this respect, the heights of the first detecting section 61 and the second detecting section 62 in the photodetecting device 60 used in the optical pickup apparatus 100 embodying this invention are set different from each other so that the reception positions of the returning lights Ldr and Lcr or the optical path lengths of the returning lights Ldr and Lcr are made different from each other, thus allowing the returning lights Ldr and Lcr to be received at their focal positions. The specific structure that achieve this setting is illustrated in FIGS. 7 and 8. FIG. 7 is a plan view of the photodetecting device 60 and FIG. 8 is a side view of the photodetecting device 60.

As shown in FIG. 7, the photodetecting device 60, which is designed to cope with the 3-beam method and the astigmatism method, comprises the first detecting section 61 divided into four areas 3, 4, 7 and 8 for receiving a main beam M1 from a DVD (the main beam of the first laser beam), the second detecting section 62 divided into four areas 1, 2, 5 and 6 for receiving a main beam M2 from a CD (the main beam of the second laser beam), and two sub detecting sections 63a and 63b which respectively receive sub beams S1a and S2a of the first laser beam and sub beams S1b and S2b of the second laser beam. Those sub beams are used in generating a tracking error signal TE. The first detecting section 61 is arranged in parallel and close to the second detecting section 62. The two sub detecting sections 63a and 63b are arranged on a substrate 64 sandwiching the first detecting section 61 and the second detecting section 62.

As shown in FIG. 8, the first detecting section 61 and the second detecting section 62 are disposed in such a way that their light-receiving surfaces are approximately perpendicular to the main rays of the returning lights Ldr and Lcr and their heights in the direction of the main rays are set different from each other by, for example, ΔL so as to be able to receive the returning lights Ldr and Lcr of the first and second laser beams at the adequate positions. Specifically, the light-receiving surface of the first detecting section 61 is so positioned that the cross section of the returning light Ldr, which has been given astigmatism by the cylindrical lens 56, becomes approximately circular, and likewise the light-receiving surface of the second detecting section 62 is so positioned that the cross section of the returning light Lcr, which has been given astigmatism by the cylindrical lens 56, becomes approximately circular.

The heights h of the two sub detecting sections 63a and 63b are set to approximately the middle of the height of the first detecting section 61 and the height of the second detecting section 62. That is, the heights of the two sub detecting sections 63a and 63b are set this way to receive both the sub beams S1a and S2a of the first laser beam and the sub beams S1b and S2b of the second laser beam, thus minimizing the adverse influence of the chromatic aberration.

The heights of the first detecting section 61 and the second detecting section 62 along the main rays are not limited to the aforementioned heights, but may be set in such a way that the light-receiving surfaces can be set as close as possible to the positions where the beams' cross sections become approximately circular and the adverse influence of the chromatic aberration can be reduced, little or significantly, as compared with the case of the photodetecting device whose first detecting section and second detecting section have their light-receiving surfaces formed on the same plane.

Figure 9:
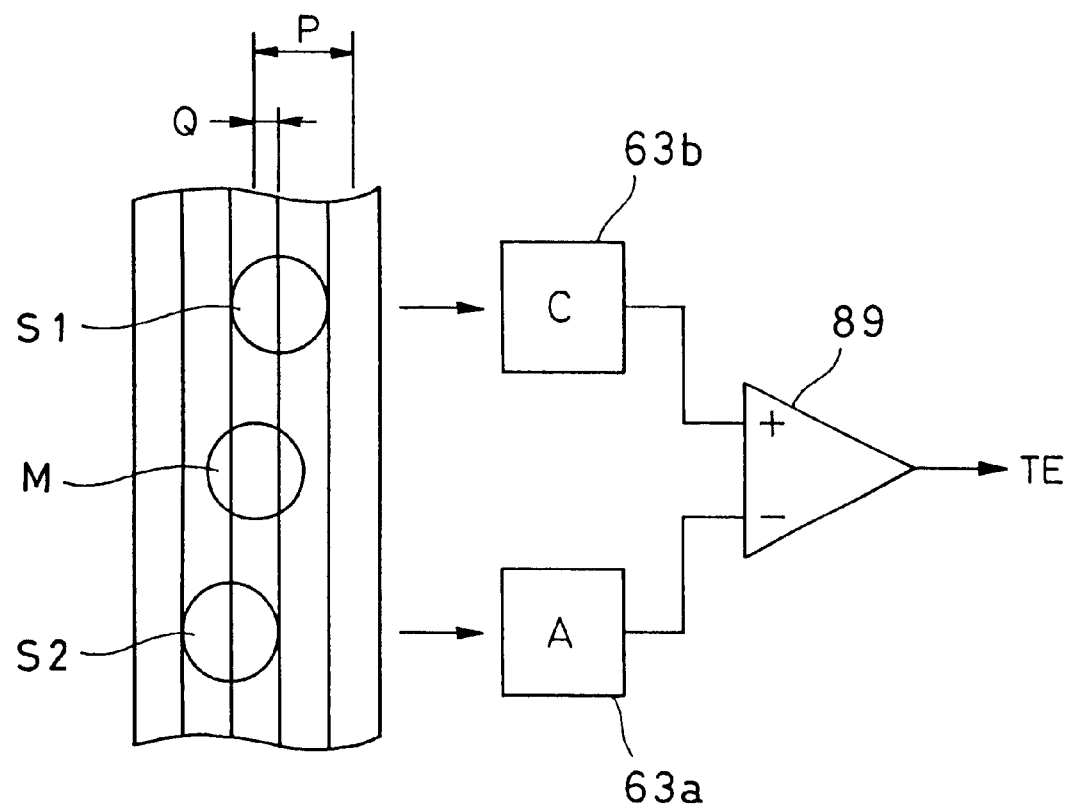
FIG. 9 is a diagram for explaining a 3-beam method.

The brief digest of the 3-beam method and the astigmatism method that are used in this embodiment will now be given referring to FIGS. 9 and 10A to 10C. As shown in FIG. 9, the 3-beam method offsets two sub beam spots S1 and S2 by Q in the opposite directions with respect to a main beam spot M. The amount of offset Q is set to about ¼ of a track pitch P. The reflected lights of the sub beam spots S1 and S2 are respectively detected by the sub detecting sections 63a and 63b, and the difference between the detection outputs becomes the tracking error signal TE.

Figure 10A:
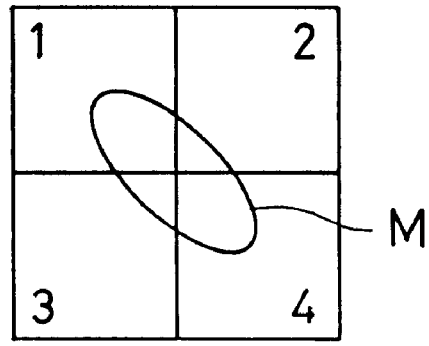
FIGS. 10A through 10C are diagrams for explaining an astigmatism method.
Figure 10B:
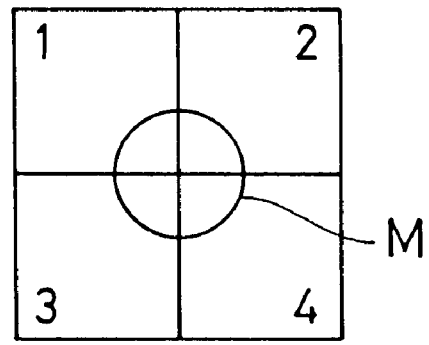
Figure 10C:
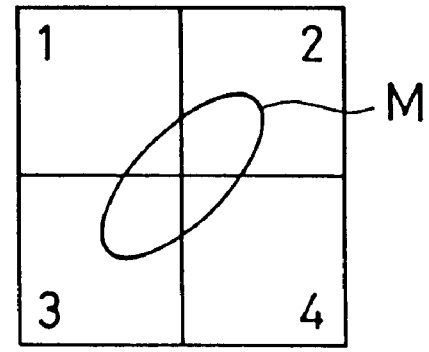

One of the segmenting lines of the 4-segment detecting section for carrying out the astigmatism method is set parallel to the track direction of the information recording surface while the other segmenting line is set parallel to the radial direction of the optical disk. When the beam spot has an approximately circular shape, as shown in FIG. 10B, the areas of the beam spot irradiated on the light-receiving sections located on the diagonal lines become equal to each other and the focus error signal component FE becomes "0". In the defocused case, the astigmatism characteristic of the cylindrical lens 56 causes an diagonally elliptical beam spot to be formed as shown in FIG. 10A or 10C. In this case, the area of the beam spot irradiated on the light-receiving sections located on one diagonal line differs from the area of the beam spot irradiated on the light-receiving sections located on the other diagonal line, and the difference is output as the focus error signal FE. Then, an electric signal according to the spot images formed on the four light-receiving surfaces is supplied to a demodulator and an error correcting circuit.

Referring to FIG. 11, a description will now be given of an arithmetic operation circuit which computes the tracking error signal TE, the focus error signal FE and an RF signal from the detection results from the photodetecting device 60 of this embodiment. As shown in this FIG., an arithmetic operation section 80 comprises six adders 81 to 86 and three subtracters 87 to 89. Let us denote a detection signal from the sub detecting section 63a as "A", a detection signal from the sub detecting section 63b as "C" and eight detection signals output from the segmented areas 1, 2, 5 and 6 of the first detecting section and the segmented areas 3, 4, 7 and 8 of the second detecting section as "B1", "B2", "B5", "B6", "B3", "B4", "B7" and "B8".

The two sub detecting sections 63a and 63b serve to detect a tracking error signal and are commonly used with respect to the first laser beam and the second laser beam. The detection signals A and C output from the two sub detecting sections 63a and 63b are subtracted from each other by the subtracter 89 and the result "A–C" becomes the tracking error signal TE.

With B1 to B8 denoting the detection outputs of the first and second detecting sections 61 and 62 each segmented into four areas, the detection outputs B1 and B6 of the second detecting section 62 are added by the adder 81. Further, the detection outputs B2 and B5 are added by the adder 82. The outputs of the adders 81 and 82 are added by the adder 85. The output signal of the adder 85 becomes B1+B2+B5+B6, which becomes the RF signal of the second detecting section 62 (second RF signal). The outputs of the adders 81 and 82 are further subtracted from each other by the subtracter 87. The output signal of the subtracter 87 becomes (B+B6)–(B2+B5), which becomes the focus error signal FE of the second detecting section 62 (second FE signal).

The detection outputs B3 and B8 of the first detecting section 61 are added by the adder 83. Further, the detection outputs B4 and B7 are added by the adder 84. The outputs of the adders 83 and 84 are added by the adder 86. The output signal of the adder 86 becomes B3+B8+B4+B7, which becomes the RF signal of the first detecting section 61 (first RF signal). The outputs of the adders 83 and 84 are further subtracted from each other by the subtracter 88. The output signal of the subtracter 88 becomes (B3+B8)−(B4+B7), which becomes the focus error signal FE of the first detecting section 61 (first FE signal).

Figure 12:
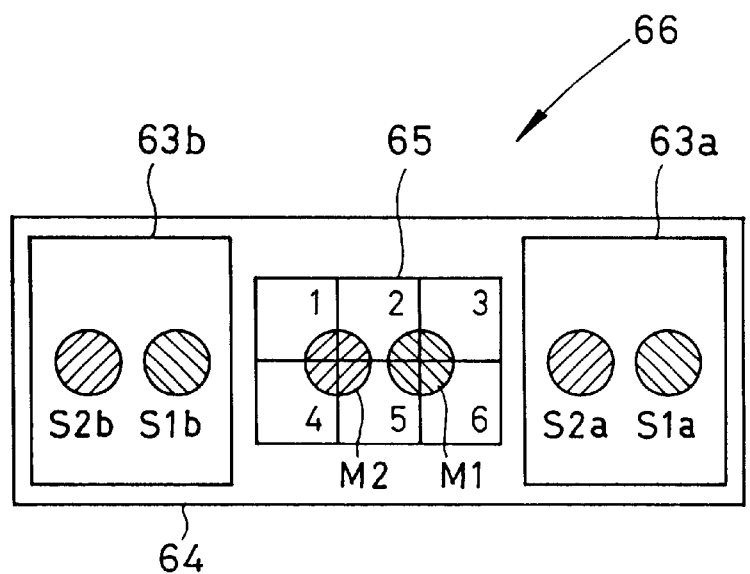
FIG. 12 is a plan view of photodetecting sections used in a second embodiment of the optical pickup apparatus according to this invention.
Figure 13:
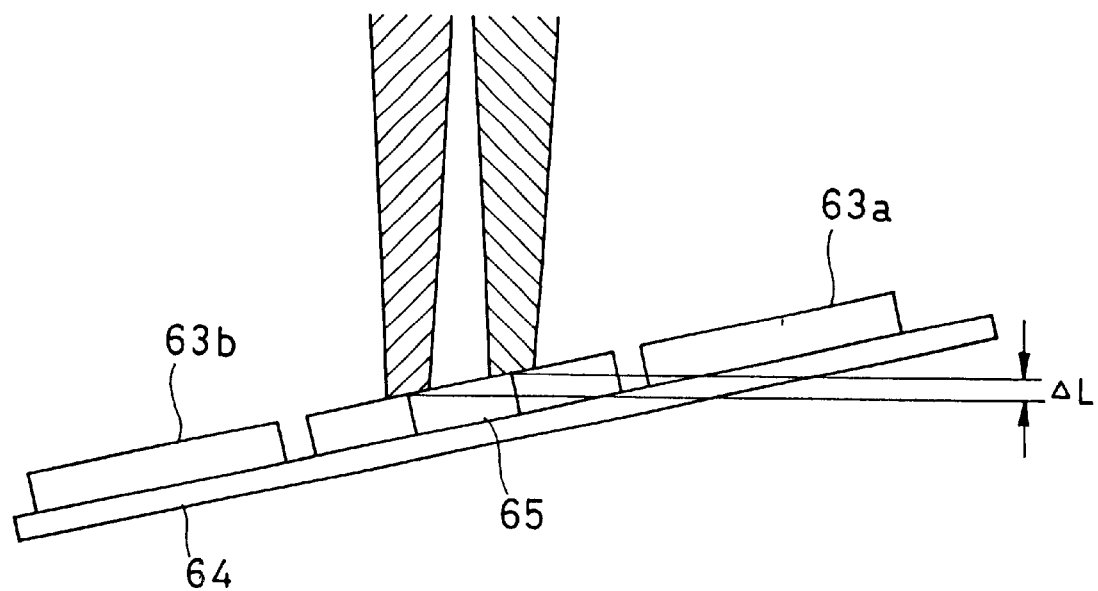
FIG. 13 is a side view of the photodetecting sections used in the second embodiment of the optical pickup apparatus according to this invention.

The second embodiment of the optical pickup apparatus 100 of this invention will now be described referring to FIGS. 12 to 14. This embodiment differs from the first embodiment only in the structure that is associated with a photodetecting device 66 and is identical to the first embodiment in the other structures. FIG. 12 is a plan view of the photodetecting device 66 and FIG. 13 is a side view of the photodetecting device 66.

The photodetecting device 66 shown in FIG. 12 comprises a 6-segment photodetecting section 65 having parts of the aforementioned first detecting section 61 and second detecting section 62 commonly used to receive the main beams M1 and M2 of the first and second laser beams, and two sub detecting sections 63a and 63b which receive the sub beams S1a, S2a, S1b and S2b of the first and second laser beams and are used for generating the tracking error signal TE. The 6-segment photodetecting section 65 and the sub detecting sections 63a and 63b each having a larger outer shape than the 6-segment photodetecting section 65 are provided on the substrate 64 at the same height so that the light-receiving surfaces of the 6-segment photodetecting section 65 and the two sub detecting sections 63a and 63b lie on the same plane. To reduce the adverse influence of the chromatic aberration, the photodetecting device 66 is designed in such a manner that as shown in FIG. 13, the substrate 64 is inclined, making the height of the light-receiving surface for receiving the main beam M1 of the first laser beam different from the height of the light-receiving surface for receiving the main beam M2 of the second laser beam by ΔL along the main rays.

Figure 14:
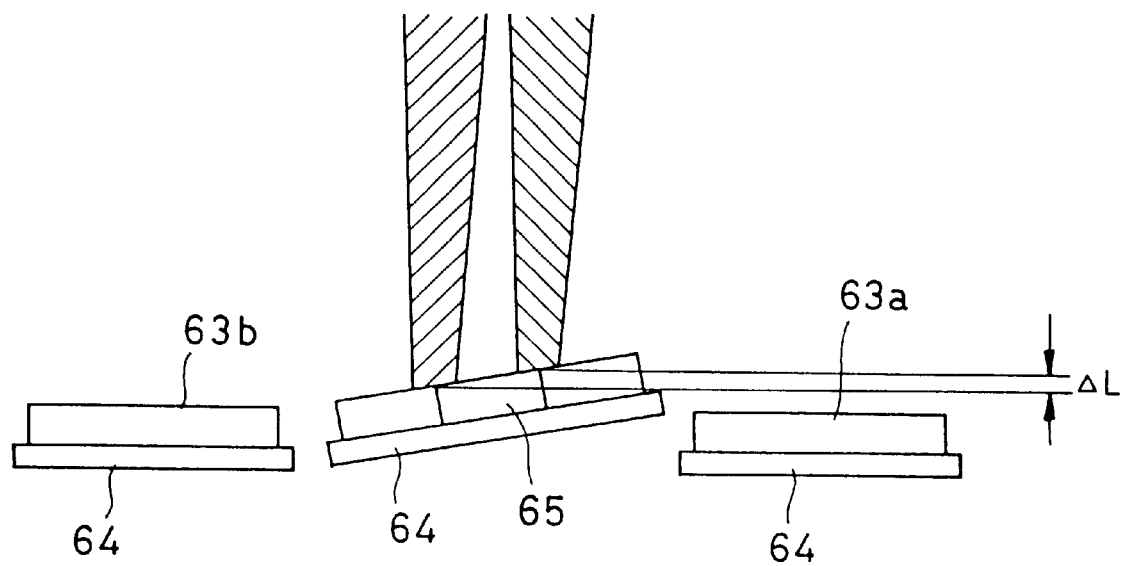
FIG. 14 is a side view showing an application example of the photodetecting sections used in the second embodiment of the optical pickup apparatus according to this invention.

The photodetecting device 66 shown in FIG. 14 is an application example of the second embodiment in which only the 6-segment photodetecting section 65 is tilted and the light-receiving surfaces of the sub detecting sections 63a and 63b are so set as to be perpendicular to the main rays of the first and second laser beams. The height of the light-receiving surface for receiving the main beam M1 of the first laser beam and the height of the light-receiving surface for receiving the main beam M2 of the second laser beam should be adequately set to eliminate the adverse influence of the chromatic aberration as done in the first embodiment.

As shown in FIG. 12, the main beam M1 of the first laser beam is received by the segmented areas 2, 3, 5 and 6 of the photodetecting section 65 and the main beam M2 of the second laser beam is received by the segmented areas 1, 2, 4 and 5 of the photodetecting section 65. That is, the segmented areas 2 and 5 of the photodetecting section 65 are commonly used to receive the main beams M1 and M2.

In the case of receiving the first laser beam, therefore, B2+B6+B3+B5, the result of performing arithmetic operations on the detection outputs of the segmented areas 2, 3, 5 and 6, becomes the RF signal for a DVD, and (B2+B6)−(B3+B5), likewise the result of performing arithmetic operations on the detection outputs, becomes the focus error signal FE for a DVD. When the second laser beam is received, on the other hand, likewise, B1+B5+B2+B4 becomes the RF signal for a CD, and (B1+B5)−(B2+B4) becomes the focus error signal FE for a CD. The tracking error signal TE becomes A−C as in the first embodiment. This structure can provide the same advantages as given by the photodetecting device 60 used in the first embodiment.

Figure 15:
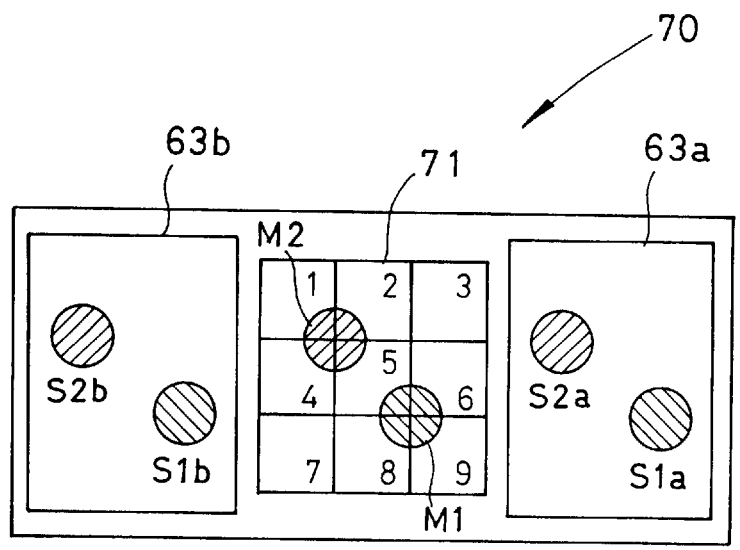
FIG. 15 is a plan view of photodetecting sections used in a third embodiment of the optical pickup apparatus according to this invention.
Figure 16:
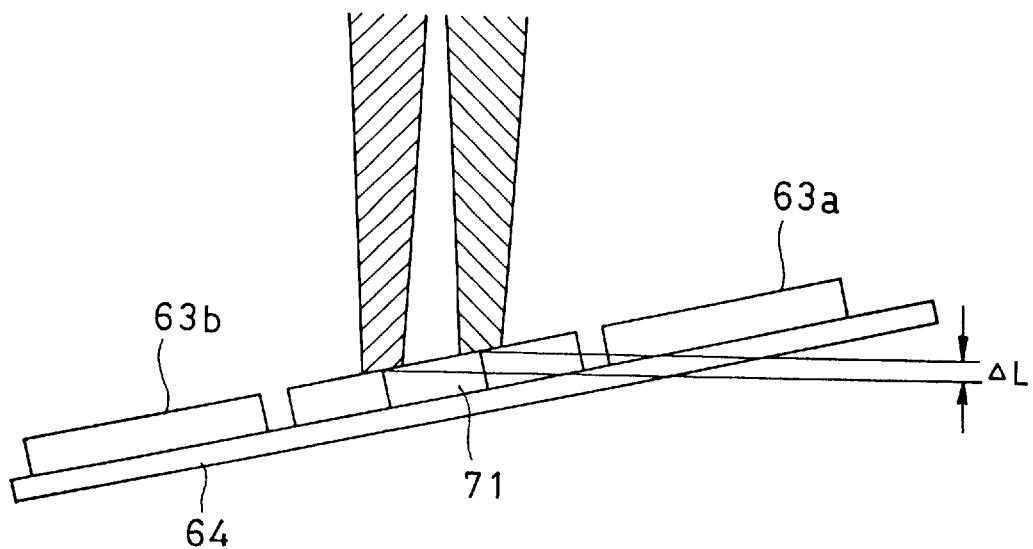
FIG. 16 is a side view of the photodetecting sections used in the third embodiment of the optical pickup apparatus according to this invention.

The third embodiment of the optical pickup apparatus 100 of this invention will now be discussed referring to FIGS. 15 and 16. This embodiment differs from the first embodiment only in the structure that is associated with a photodetecting device 70 and is identical to the first embodiment in the other structures. FIG. 15 is a plan view of the photodetecting device 70 and FIG. 16 is a side view of the photodetecting device 70.

The photodetecting device 70 comprises a 9-segment photodetecting section 71, which is a 9-segment detector having segmented areas 1 to 9 arranged in 3 columns by 3 rows, and two sub detecting sections 63a and 63b which receive the sub beams S1a, S2a, S1b and S2b of the first and second laser beams and are used for generating the tracking error signal TE. The 9-segment photodetecting section 71 and the sub detecting sections 63a and 63b each having a larger outer shape than the 9-segment photodetecting section 71 are provided on the substrate 64 at the same height so that the light-receiving surfaces of the 9-segment photodetecting section 71 and the two sub detecting sections 63a and 63b lie on the same plane. To reduce the adverse influence of the chromatic aberration, the photodetecting device 70 is designed in such a manner that as shown in FIG. 16, the substrate 64 is inclined, making the height of the light-receiving surface for receiving the main beam M1 of the first laser beam different from the height of the light-receiving surface for receiving the main beam M2 of the second laser beam by ΔL along the main rays, as per the second embodiment.

As shown in FIG. 15, the main beam M1 of the first laser beam is received by the segmented areas 5, 6, 8 and 9 while the main beam M2 of the second laser beam is received by the segmented areas 1, 2, 4 and 5. In the case where the first laser beam is received, therefore, B5+B9+B6+B8 becomes the RF signal for a DVD, and (B5+B9)−(B6+B8) becomes the focus error signal FE for a DVD. In the case where the second laser beam is received, B1+B5+B2+B4 becomes the RF signal for a CD, and (B1+B5)−(B2+B4) becomes the focus error signal FE for a CD. The tracking error signal TE becomes A−C as in the first and second embodiments.

The advantage of using the photodetecting device 70 having the 9-segment photodetecting section 71 will now be discussed. As mentioned above, the spot of the beam emitted from the semiconductor laser device 50 has an approximately elliptical shape. There is a known design scheme which can provide the desired reading performance by adequately setting the angle between the major axis of the elliptical beam spot and the tracks of the disk. At the time of making this setting, if the photodetecting device 66 shown in FIG. 8 is used, the position of the photodetecting device 66 should also be adjusted in accordance with the positional adjustment of the semiconductor laser device 50. But, the use of the photodetecting device 70 having the 9-segment photodetecting section 71 according to this embodiment can permit the angle of the approximately elliptical beam spot to be adjusted without adjusting the position of the photodetecting device 70. This point will be specifically described with reference to FIGS. 17A to 17C, 18A to 18C and 19A to 19C.

Figure 17A:
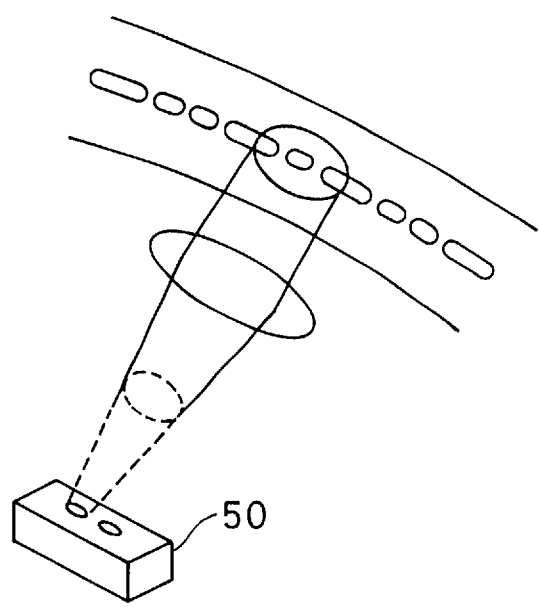
FIGS. 17A through 17C are diagrams illustrating a detection method of the photodetecting sections when the major axis of a beam spot is arranged in parallel to tracks.
Figure 17B:
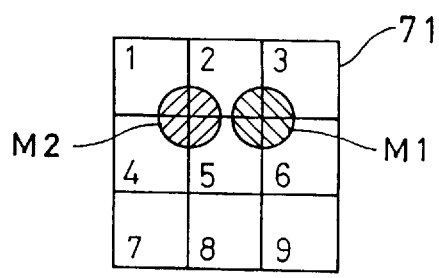
Figure 17C:
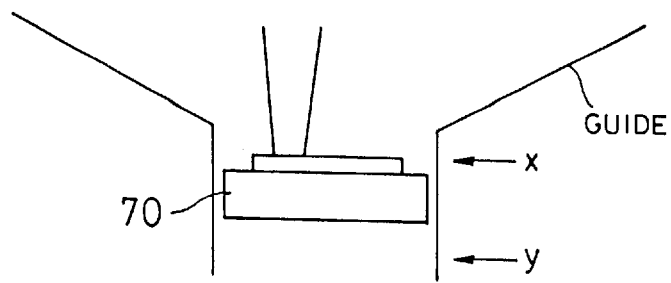

FIGS. 17A through 17C illustrate the semiconductor laser device 50 laid out in such a manner that the major axis of the elliptical beam spot to be irradiated on the tracks of the optical disk 55 as a recording medium becomes in parallel to the tracks.

When the laser beam is irradiated in such a way that the major axis of the beam spot becomes in parallel to the tracks as shown in FIG. 17A, the beam spot comes over adjoining pits. This deteriorates the resolution, thus lowering the detection precision of the RP signal. As the area the beam spot lies on the track becomes wider, however, the detection precision of the ON track detection signal is high. This case is therefore suitable for executing a track count and search which moves to the desired address while counting the tracks, and is thus suited for an apparatus which carries out fast searching.

At this time, the main beam M1 of the first laser beam received by the 9-segment photodetecting section 71 is allowed to be received by the segmented areas 2, 3, 5 and 6 and the main beam M2 of the second laser beam is allowed to be received by the segmented areas 1, 2, 4 and 5 as shown in FIG. 17B. The photodetecting device 70 is constructed in such a way as to be able to move only along the main rays of the laser beam by a guide structure shown in FIG. 17C, so that the distance between the light-receiving points of the first laser beam and the second laser beam can be set to the desired value. In this example, the photodetecting device 70 is set to, for example, the position marked "x" in the diagram to minimize the distance between the light-receiving points of the first and second laser beams.

Figure 18A:
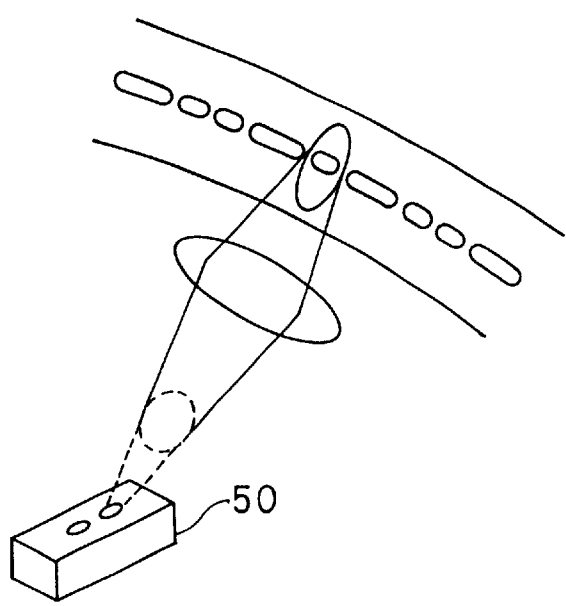
FIGS. 18A through 18C are diagrams illustrating a detection method of the photodetecting sections when the major axis of a beam spot is arranged perpendicular to the tracks.
Figure 18B:
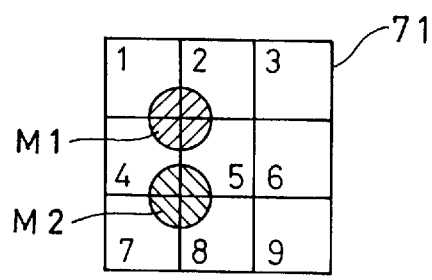
Figure 18C:
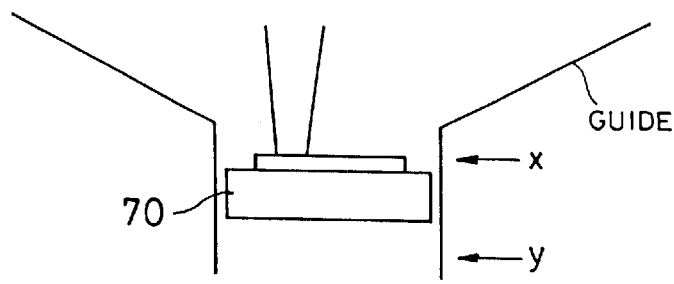

FIGS. 18A through 18C illustrate the semiconductor laser device 50 laid out in such a manner that the major axis of the elliptical beam spot to be irradiated on the tracks of the optical disk 55 as a recording medium becomes perpendicular to the tracks. Because the major axis of the beam spot becomes perpendicular to the tracks and the beam spot does not come over adjoining pits as shown in FIG. 18A, the resolution becomes higher than that in the case of FIG. 17A. As the area the beam spot lies on the track becomes smaller than that in the case of FIG. 17A, however, the track detection precision becomes lower. This case is therefore suitable for an apparatus which takes the detection precision of the reproduced signal more seriously.

In this state, the main beam M1 of the first laser beam received by the 9-segment photodetecting section 71 is allowed to be received by the segmented areas 1, 2, 4 and 5 and the main beam M2 of the second laser beam is allowed to be received by the segmented areas 4, 5, 7 and 8 as shown in FIG. 18B. This can permit both the main beams M1 and M2 to be received in the proper states without moving the position of the photodetecting device 70 from the state shown in FIG. 17B. As the distance between the light-receiving points of the first laser beam and the second laser beam is the same as the one in the case of FIG. 17B, it is unnecessary to move the photodetecting device 70 along the guide structure in the direction of the main rays of the laser beam and is set to the position marked "x" in the diagram as in the case of FIG. 17C.

Figure 19A:
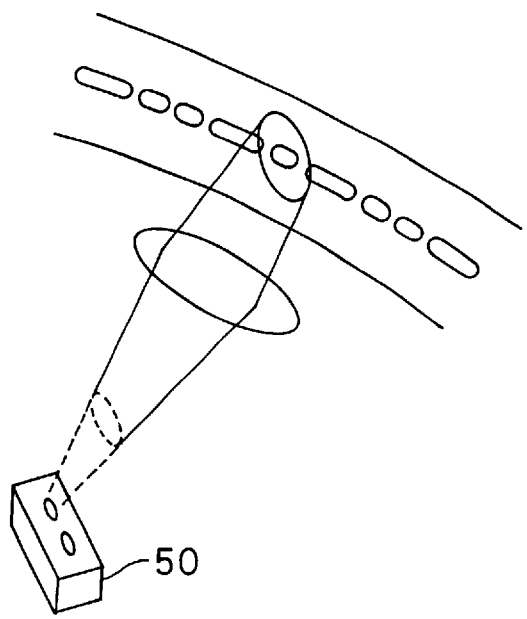
FIGS. 19A through 19C are diagrams illustrating a detection method of the photodetecting sections when the major axis of a beam spot is arranged at approximately 45 degrees to the tracks.
Figure 19B:
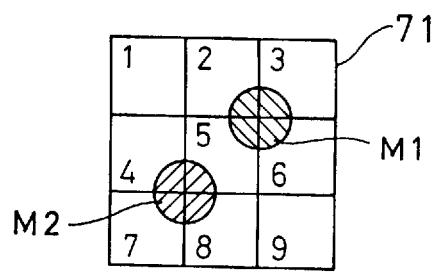
Figure 19C:
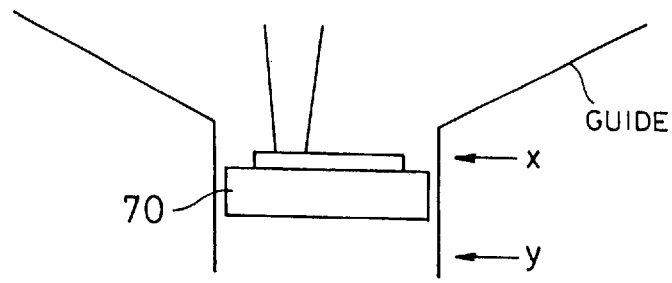

FIGS. 19A through 19C illustrate the semiconductor laser device 50 laid out in such a manner that the major axis of the elliptical beam spot to be irradiated on the tracks of the optical disk 55 as a recording medium is at approximately 45 degrees to the tracks. The performance in this case is the one between the performance of the case of FIGS. 17A–17C and the performance of the case of FIGS. 18A–18C, so that this case is suited for a practical apparatus whose ON track detection precision and detection precision of the reproduced signal are both not deteriorated.

At this time, the main beam M1 of the first laser beam received by the 9-segment photodetecting section 71 allowed to be received by the segmented areas 2, 3, 5 and 6 and the main beam M2 of the second laser beam is allowed to be received by the segmented areas 4, 5, 7 and 8 as shown in FIG. 19B. This can permit both the main beams M1 and M2 to be received in the proper states without turning the position of the photodetecting device 70. As the distance between the light-receiving points of the first laser beam and the second laser beam becomes wider than those in the cases of FIG. 17B and FIG. 18B. the photodetecting device 70 is moved along the guide structure in the direction of the main rays of the laser beam and is set to the position marked "y" shown in FIG. 19C.

As described above, when the beam spot has an elliptical shape, the performance varies depending on the angle of the beam spot to the tracks. It is therefore possible to develop products which match with the demanded performance by setting the inclination angle of the beam spot according to the demanded performance, such as selecting the method shown in FIGS. 18A–18C which provides a high resolution when the precision of photoelectric conversion of the RF signal or the conversion power of the RF signal is low and selecting the method shown in FIGS. 17A–17C which provides a high track detection precision when it is necessary to perform fast searching.

As applications of this embodiment, the photodetecting device may be adapted to a 16-segment detector having segmented areas 1 to 16 arranged in 4 columns by 4 rows, a 25-segment detector having segmented areas 1 to 25 arranged in 5 columns by 5 rows, and so forth. Increasing the number of segmented areas is advantageous in that the adjustment range of the distance between the light-receiving points of the main beams M1 and M2 becomes variable and the sub beams can be received.

Figure 20:
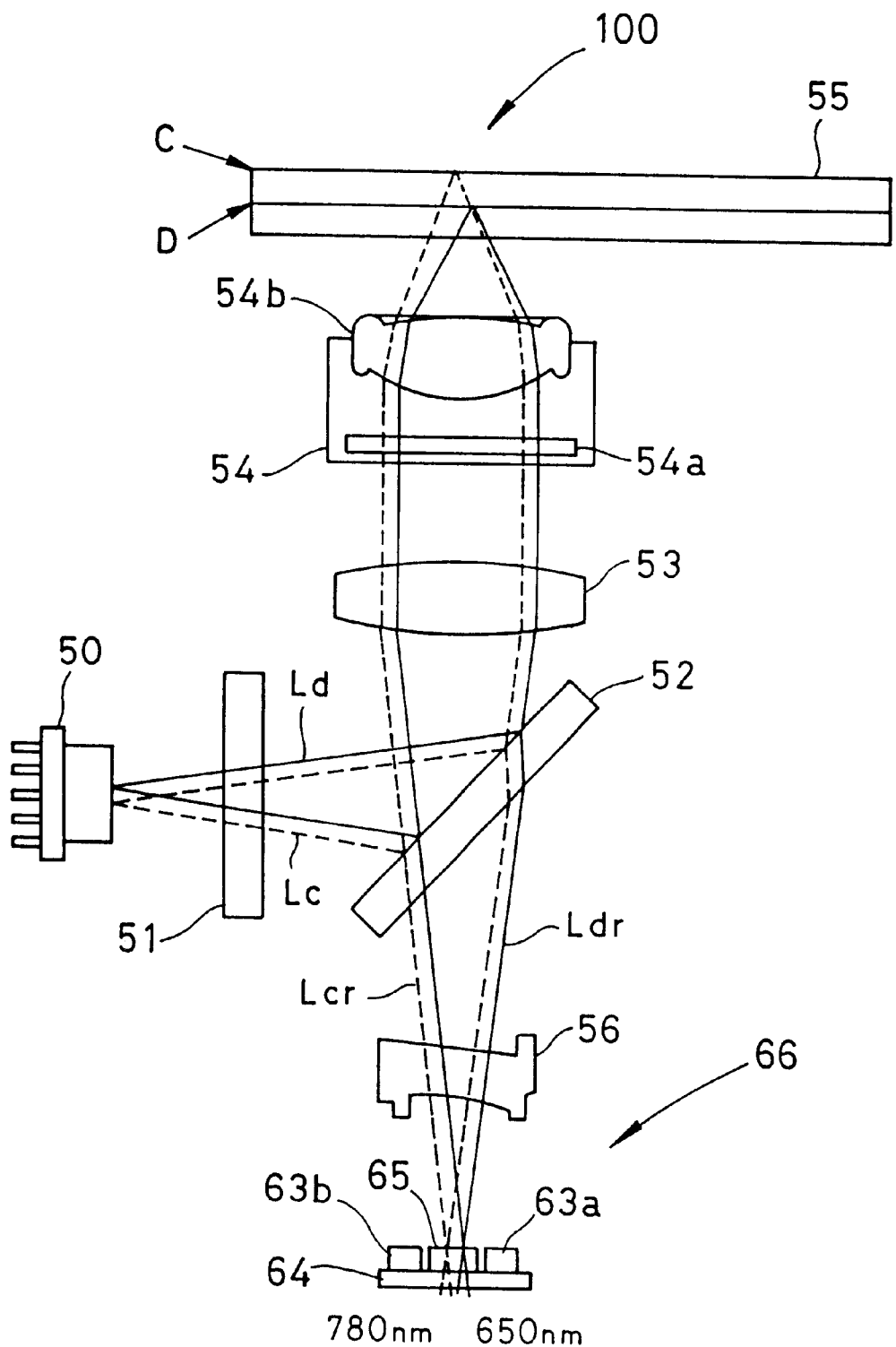
FIG. 20 is a structural diagram of a fourth embodiment of the optical pickup apparatus according to this invention.

The fourth embodiment of the optical pickup apparatus 100 of this invention will now be discussed referring to FIGS. 20 and 21. This embodiment uses the same photodetecting device 66 as used in the second embodiment but in a different layout, and is identical to the first to third embodiments in the other structures. FIG. 20 shows the general structure of the fourth embodiment of the optical pickup apparatus 100, and FIG. 21 shows the photodetecting device 66.

Figure 21:
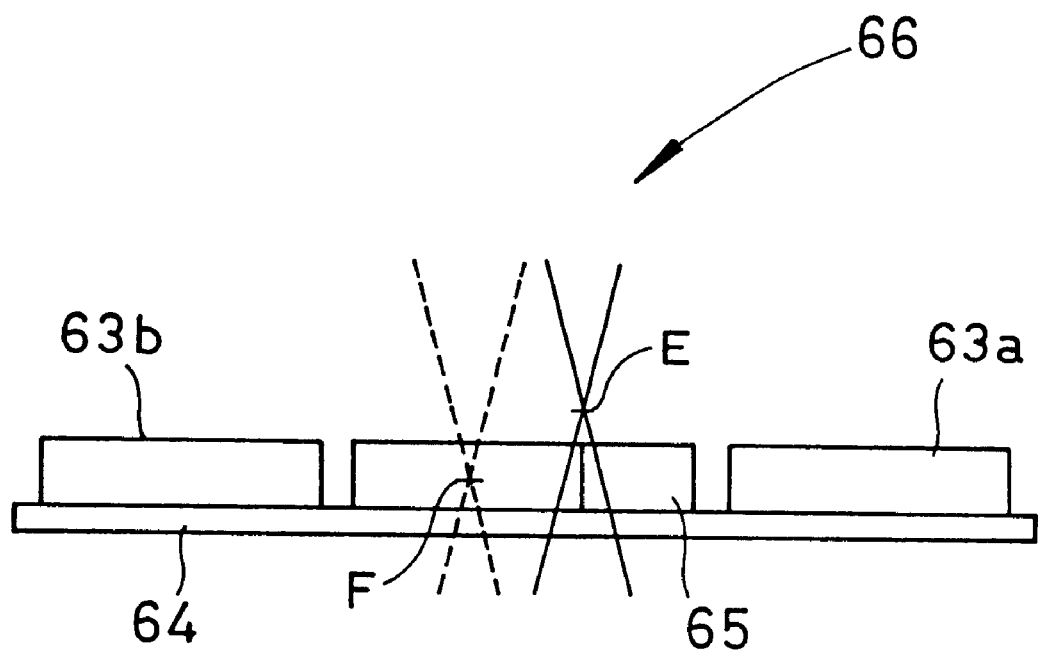
FIG. 21 is a side view of photodetecting sections used in the fourth embodiment of the optical pickup apparatus according to this invention.

In this embodiment, as shown in FIG. 21, the light-receiving surface of the photodetecting section 65 is set perpendicular to the main rays of the main beams M1 and M2. Further, the light-receiving surface of the photodetecting section 65 is positioned between a position E where the cross section of the main beam M1 which has been given astigmatism becomes approximately circular and a position F where the cross section of the main beam M2 which has likewise been given astigmatism becomes approximately circular in the direction of the main rays of the main beams.

While this embodiment causes a slight error to occur in the focus error signal of each of the main beams M1 and M2, the embodiment does not require the cost-increasing structures and troublesome positioning works of the first embodiment in which the heights of the first and second detecting sections are made different from each other and the second embodiment in which the photodetecting device is inclined, and can reduce the adverse influence of the chromatic aberration, well balanced for the main beams M1 and M2. The photodetecting device 66 that is used in the first embodiment and is shown in FIG. 7 may also be used.

Although the individual embodiments of the optical pickup apparatus 100 of this invention are constructed by an infinite optical system which converts scattered light into parallel light using the collimator lens 53, they are not limited to this type but may be constructed by a finite optical system.

The structure of the objective lens is not limited to the bifocal lens of the individual embodiments, but a bifocal lens having a plurality of segmented surfaces formed by notches as described in, for example, Japanese Unexamined Patent Publication No. Hei 10-199021. Further, two objective lenses, one for playing a DVD and the other for playing a CD, may be provided and selectively switched from one to the other.

The focus servo control and the tracking servo control are not limited to the above-described modes of the individual embodiments, but various known methods may be used as well. The same control methods need not be performed for information reproduction from a DVD and from a CD, but different methods may be combined. For example, the tracking servo control may be carried out using the 3-beam method at the time of playing a CD and the tracking servo control may be carried out using the phase difference method at the time of playing a DVD.

In short, this invention can eliminate the need for a synthesizing prism, thus reducing the quantity of components of the optical system, and can put the components of the optical system together, thus ensuring a lower cost and smaller space. Further, a part of the photodetecting device can be shared for two laser beams with different optical paths, thus leading to cost reduction and size reduction of the photodetecting device.

What is claimed is:

1. An optical pickup apparatus capable of reading information from recording media of different read wavelengths, comprising:
   a light-emitter having a first light source for emitting a first laser beam integrated with a second light source, located close to said first light source, for emitting a second laser beam of a different wavelength from that of said first laser beam;
   a photodetector for receiving a beam reflected by each of said recording media, said photodetector including a nine-divided detector having nine light-receiving areas arranged in three columns by three rows; and
   an optical system having a plurality of optical elements which form an optical path to guide said first and second laser beams to said recording media and form an optical path for guiding said reflected beam to said photodetector and through which said first and second laser beams pass,
   wherein different combinations of said nine light-receiving areas of said photo detectors are respectively used to receive said first and second laser beams.

2. The optical pickup apparatus according to claim 1, wherein each of said first and second laser beam is received at four of said nine light-receiving areas of said nine-divided detector.

3. The optical pickup apparatus according to claim 1, wherein four of said nine light-receiving areas include a center one of said nine light-receiving areas and are arranged in two columns by two rows.

4. The optical pickup apparatus according to claim 1, wherein four light-receiving areas of said nine-divided detector which receive said first laser beam are different from said four light-receiving areas of said nine-divided detector which receive said second laser beam.

5. The optical pickup apparatus according to claim 1, wherein said photodetector further comprises first and second sub detecting sections arranged to sandwich said first and second detecting sections.

6. The optical pickup apparatus according to claim 1, wherein said light-emitter comprises a semiconductor laser device including a one-chip laser diode.

7. The optical pickup apparatus according to claim 1, wherein said light-emitter includes a first light source and a second light source.

8. An optical pickup apparatus capable of reading information from recording media of different read wavelengths, comprising:
   a light-emitter having a first light source for emitting a first laser beam integrated with a second light source for emitting a second laser beam of a different wavelength from that of said first laser beam;
   a photodetector for receiving a beam reflected by each of said recording media, said photodetector including a nine-divided detector having nine light-receiving areas arranged in three columns by three rows; and
   an optical system having a plurality of optical elements which form an optical path to guide said first and second laser beams to said recording media and form an optical path for guiding said reflected beam to said photodetector and through which said first and second laser beams pass,
   wherein each of said first and second laser beam is received at four of said nine light-receiving areas of said nine-divided detector, which include a center one of said nine light-receiving areas and are arranged in two columns by two rows, and said four light-receiving areas of said nine-divided detector which receive said first laser beam are different from said four light-receiving areas of said nine-divided detector which receive said second laser beam.

9. The optical pickup apparatus according to claim 8, wherein at least a read signal and a focus error signal are generated by performing an arithmetic operation on amounts of light respectively received at said four light-receiving areas.

10. The optical pickup apparatus according to claim 9, wherein a pair of light-receiving sections to be used in generating a tracking error signal are respectively formed on both sides of said nine-divided detector in such a range as to be able to receive both a pair of first sub beams generated on both sides of said first laser beam with said first laser beam in between and a pair of second sub beams generated on both sides of said second laser beam with said second laser beam in between.

11. The optical pickup apparatus according to claim 8, wherein a pair of light-receiving sections to be used in generating a tracking error signal are respectively formed on both sides of said nine-divided detector in such a range as to be able to receive both a pair of first sub beams generated on both sides of said first laser beam with said first laser beam in between and a pair of second sub beams generated on both sides of said second laser beam with said second laser beam in between.

* * * * *